United States Patent
Joos et al.

(10) Patent No.: US 6,378,496 B1
(45) Date of Patent: Apr. 30, 2002

(54) FUEL SUPPLY SYSTEM FOR AN INTERNAL COMBUSTION ENGINE IN A MOTOR VEHICLE IN PARTICULAR

(75) Inventors: Klaus Joos, Walheim; Gerd Grass, Schwieberdingen; Ruediger Weiss, Moetzingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/464,169

(22) Filed: Dec. 16, 1999

(30) Foreign Application Priority Data

Dec. 16, 1998 (DE) .......................... 198 58 058

(51) Int. Cl.$^7$ ............................................ F02M 51/00
(52) U.S. Cl. ................ 123/435; 123/480; 123/494
(58) Field of Search ................ 123/435, 480, 123/486, 488, 489, 491, 494, 672, 688; 701/113

(56) References Cited

U.S. PATENT DOCUMENTS

| | | | | |
|---|---|---|---|---|
| 4,524,745 A | * | 6/1985 | Tominari et al. | 123/478 |
| 4,531,495 A | * | 7/1985 | Yamato et al. | 123/479 |
| 4,541,386 A | * | 9/1985 | Kishi et al. | 123/479 |
| 4,542,729 A | * | 9/1985 | Yamato et al. | 123/690 |
| 4,741,312 A | * | 5/1988 | Ohishi | 123/674 |
| 4,771,753 A | * | 9/1988 | Ohishi | 123/674 |
| 4,901,699 A | * | 2/1990 | Miwa et al. | 123/428 |
| 4,944,271 A | * | 7/1990 | Iwata et al. | 123/494 |
| 5,191,531 A | * | 3/1993 | Kurosu et al. | 701/103 |

* cited by examiner

*Primary Examiner*—John Kwon
*Assistant Examiner*—Hieu T. Vo
(74) *Attorney, Agent, or Firm*—Kenyon & Kenyon

(57) ABSTRACT

A fuel supply system for an internal combustion engine in a motor vehicle in particular is provided with a control unit for determining a quantity of fuel to be supplied to a cylinder. An injection valve is provided for injecting the quantity of fuel to be supplied. The control unit determines whether combustion has taken place in the cylinder. The quantity of fuel supplied to the cylinder where no combustion has taken place is determined by the control unit.

13 Claims, 3 Drawing Sheets

FUEL SUPPLY SYSTEM FOR AN INTERNAL COMBUSTION ENGINE IN A MOTOR VEHICLE IN PARTICULAR

FIELD OF THE INVENTION

The present invention relates to a method for operating a fuel supply system for an internal combustion engine in a motor vehicle in particular, with a quantity of fuel to be supplied to a cylinder being determined, and with the quantity of fuel to be supplied being injected by an injection valve. In addition, the present invention relates to a fuel supply system for an internal combustion engine in a motor vehicle in particular, having a control unit for determining a quantity of fuel to be supplied to a cylinder and having an injection valve for injecting the quantity of fuel to be supplied.

BACKGROUND INFORMATION

Increasing demands are being made of internal combustion engines in motor vehicles, for example, with regard to reducing the fuel consumption and the exhaust gases produced while achieving the desired high performance at the same time. To this end, modern internal combustion engines are equipped with a fuel supply system with which the supply of fuel to the combustion chamber of the internal combustion engine is controlled and/or regulated electronically, in particular with a computer-assisted control unit. It is possible to inject the fuel into an air intake manifold of the internal combustion engine or directly into the combustion chamber of the internal combustion engine.

With the type of fuel injection mentioned last, also known as direct fuel injection, the fuel must be injected into the combustion chamber under pressure. To this end, a pressurized storage is provided, where the fuel is pumped by a pump and put under a high pressure. From there, the fuel is injected directly through injection valves into the combustion chambers of the internal combustion engine. In homogeneous operation, the start of injection is during the intake phase of the respective cylinder, while in fuel saving stratified operation, injection takes place during the compression phase.

The quantity of fuel to be injected through the injection valves directly into the combustion chambers of the internal combustion engine, plus optionally also the start and/or the end of injection, are determined by the control unit first in both modes of operation mentioned as a function of a plurality of performance quantities of the internal combustion engine. Then the injection valves are controlled by the control unit in accordance with the values thus determined.

Special starting procedures are provided for starting an internal combustion engine. At low outside temperatures in particular, the quantity of fuel to be injected must be increased in the initial injection in comparison with an internal combustion engine at operating temperature. This is necessary so that a sufficient quantity of low-boiling fuel components will be available in startup for an ignitable fuel-air mixture. Likewise, an increased quantity of fuel is necessary in startup to build up a fuel film on the inside walls of the cylinders. In the subsequent injections, this increased quantity of fuel to be injected is reduced back to the standard quantity of fuel to be injected for the internal combustion engine at operating temperature.

With the other type of fuel injection mentioned above, known as intake manifold injection, fuel is injected by an injection valve into the intake manifold of the internal combustion engine. Increased quantities of fuel are again necessary in startup to build up a fuel film, inter alia, on the inside walls of the intake tube.

It is possible that the quantity of fuel supplied to a cylinder in starting the internal combustion engine might not actually be burned. In this case, the unburned fuel goes into the exhaust pipe, inter alia. This can lead to increased emissions of pollutants, and to increased levels of unburned hydrocarbons in particular.

SUMMARY OF THE INVENTION

An object of the present invention is to provide a method of operating a fuel supply system and a fuel supply system for an internal combustion engine to permit detection of increased pollution emissions.

The object is achieved with a method and a fuel supply system of the type defined in the preamble according to the present invention in that a test is performed to determine whether combustion has taken place in the cylinder and the quantity of fuel supplied to the cylinder where no combustion has taken place is determined.

The quantity of fuel thus determined is the quantity of unburned fuel. It can enter the exhaust pipe, where it leads to increased emission of pollutants. The quantity of fuel thus determined is a value representing the possible pollution emissions. Thus increased pollution emissions can be detected on the basis of the quantity of fuel determined. For example, this information can be used by the control unit as part of error diagnosis or the like.

In an advantageous refinement of the present invention, the quantity of fuel determined is added up. In this way, additional injections into other cylinders of the internal combustion engine which do not lead to combustion in these cylinders are also taken into account by the present invention. It is thus possible to detect possible pollution emissions even more accurately on the basis of the quantity of fuel added up.

In another advantageous refinement of the present invention, the quantity of fuel added up is weighted. Through the present invention, this takes into account the fact that only a portion of the total unburned fuel, not the entire amount, leads to increased pollution emissions. It is thus possible to determine the possible pollution emissions of an internal combustion engine even more accurately on the basis of the weighted quantity of fuel.

In an advantageous embodiment of the present invention, the weighted quantity of fuel is compared with a limit value, and if the limit value is exceeded a faulty starting procedure is deduced. The maximum allowed quantity of unburned fuel is determined on the basis of the limit value. Through the present invention, the quantity of unburned fuel entering the exhaust pipe, optionally the quantity of unburned fuel added up and optionally the weighted quantity of unburned fuel is compared with this limit value. Thus, it is possible with this control unit to reliably detect increased pollution emissions.

In an advantageous refinement of the present invention, the test of whether combustion has taken place is conducted as a function of one or more of the following performance quantities of the internal combustion engine:
- an increase in temperature of the respective cylinder or all cylinders,
- an increase in pressure in the respective cylinder,
- an increase in rpm of the internal combustion engine,
- the lambda value of the exhaust gas of the respective cylinder or all cylinders, obtained by a probe evaluating the oxygen partial pressure, the quantity of unburned fuel in the exhaust gas of the respective cylinder or all cylinders, changes in ignition voltage.

With these performance quantities of the internal combustion engine, it is possible to determine by a simple method whether or not combustion has taken place in one of the cylinders. For example, if the temperature of a certain cylinder increases after firing of that cylinder's sparkplug, it can be concluded that this firing of the sparkplug has led to ignition of the air-fuel mixture in this cylinder and thus to actual combustion.

It is especially advantageous if a test is performed to determine whether the starting procedure was successful, and if the starting procedure has been successful, the quantity of fuel is compared with the limit value. For example, if a certain rpm threshold is reached or exceeded, this means that the starting procedure has been concluded successfully. In this case, the question of whether or not the starting procedure was faulty with regard to the quantity of unburned fuel entering the exhaust pipe can then be reviewed.

Likewise, it is especially advantageous if a test is performed to determine whether the starting procedure has been terminated, and if the starting procedure has been terminated, the quantity of fuel is compared with the limit value. In this case where the starting procedure has not been concluded successfully, the question of whether or not the terminated starting procedure was faulty with regard to the quantity of unburned fuel entering the exhaust pipe can also be reviewed.

The implementation of the method according to the present invention in the form of a control element provided for a control unit of an internal combustion engine in a motor vehicle in particular is especially important. A program that is capable of being run on a computing device, in particular a microprocessor, and is suitable for executing the method according to the present invention, is stored on the control element. Thus in this case, the present invention is implemented by a program stored on the control element, so that this control element provided with the program represents the present invention in the same manner as the method carried out with the program. The control element may be in particular an electric storage medium, e.g., a read-only memory.

DETAILED DESCRIPTION

Figure 1:
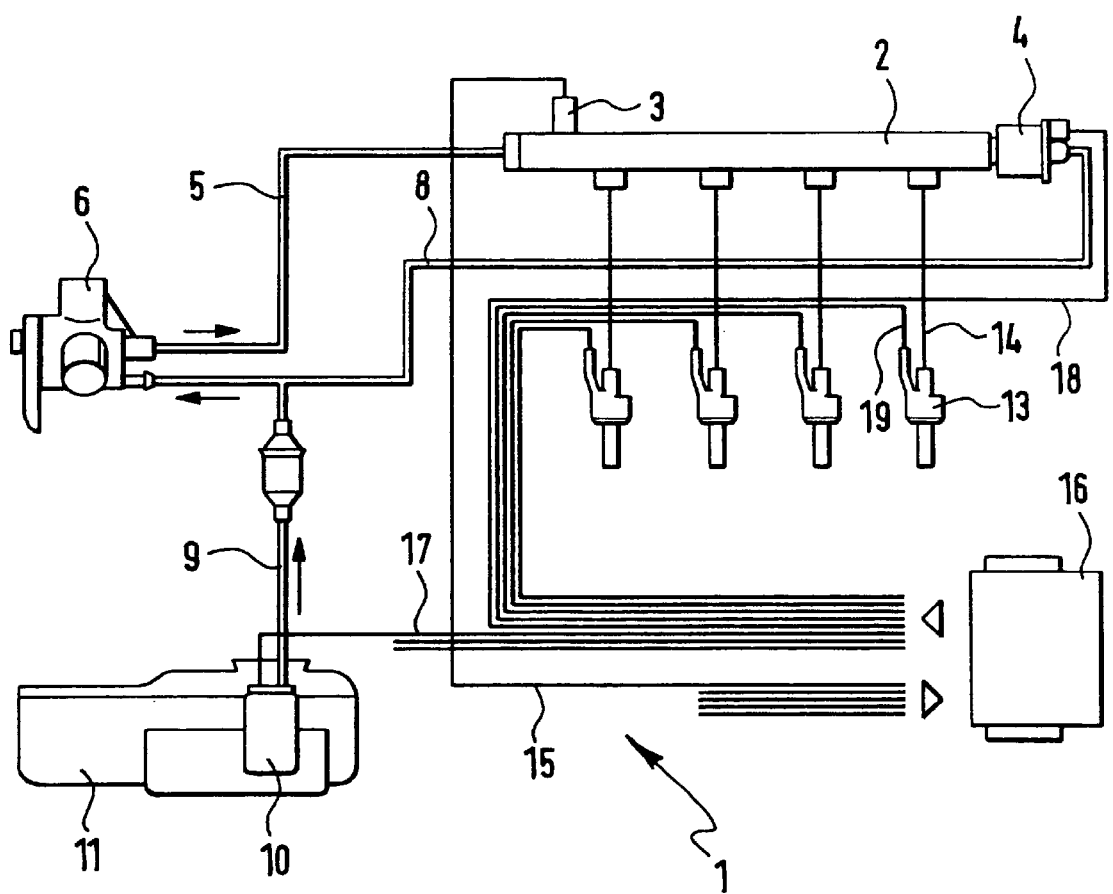
FIG. 1 shows a schematic diagram of one embodiment of a fuel supply system according to the present invention.

FIG. 1 shows a fuel supply system 1 which is provided for use with an internal combustion engine of a motor vehicle. Fuel supply system 1 is a common rail system used with an internal combustion engine having direct fuel injection in particular.

It is pointed out that the following description can also be applied with appropriate adjustments to intake manifold injection. This is pointed out below as an example.

In intake manifold injection there is no high-pressure pump (6), no pressure sensor (3) and no pressure control valve (4).

Fuel supply system 1 has a pressurized storage 2 provided with a pressure sensor 3 and a pressure control valve 4. Pressurized storage 2 is connected by a pressure line 5 to a high-pressure pump 6. High-pressure pump 6 is connected by a pressure line 8 to pressure control valve 4. Pressure control valve 4 and thus also high-pressure pump 6 are connected by a pressure line 9 and a filter to a fuel pump 10 which is suitable for intake of fuel from a fuel tank 11.

Fuel supply system 1 has four injection valves 13 which are connected by pressure lines 14 to pressurized storage 2. Injection valves 13 are suitable for injecting fuel into appropriate combustion chambers of the cylinders of the internal combustion engine.

It is also possible for fuel to be injected by injection valves 13 into the intake manifold.

An exhaust pipe leads from the cylinders of the internal combustion engine to a catalytic converter provided for purification of the exhaust gas. A lambda sensor for measuring the air-fuel mixture in the exhaust gas is present in the exhaust pipe or in the area of the catalytic converter.

Pressure sensor 3 is connected by a signal line 15 to a control unit 16 to which is also connected a plurality of other signal lines as input lines. Fuel pump 10 is connected to control unit 16 by a signal line 17, and pressure control valve 4 is connected to control unit 16 by a signal line 18. In addition, injection valves 13 are connected to control unit 16 by signal lines 19.

Fuel is pumped by fuel pump 10 from fuel tank 11 to high-pressure pump 6. With the help of high-pressure pump 6, a pressure is generated in pressurized storage 2, measured by pressure sensor 3 and it can be adjusted to a desired value by corresponding operation of pressure control valve 4 and/or by controlling fuel pump 10. Then fuel is injected through injection valves 13 into the combustion chambers of the internal combustion engine, or with intake manifold injection, fuel is injected into the intake manifold of the internal combustion engine.

The quantity of fuel to be injected for each combustion is first determined by control unit 16 as a function of a plurality of performance quantities of the internal combustion engine. Control unit 16 then controls respective injection valve 13 according to the quantity of fuel thus determined in its opened state.

Special starting procedures are performed by control unit 16 to start the internal combustion engine.

In particular, the quantity of fuel to be injected when starting the internal combustion engine must be increased when outside temperatures are low. This is necessary so that a sufficient quantity of low-boiling fuel components are available for an ignitable fuel-air mixture in startup. Likewise, an increased quantity of fuel is necessary in startup to build up a fuel film on the inside walls of the cylinders. In addition, when outside temperatures are low, fuel losses must be compensated, e.g., due to fuel entrained in the oil of the internal combustion engine.

In intake manifold injection, a film of fuel must likewise be built up on the inside walls of the intake manifold.

It is possible for the quantity of fuel supplied to a combustion chamber when starting an internal combustion engine not to be burned in fact, despite being ignited by the sparkplug provided for that cylinder. In this case, it is possible for such unburned fuel to collect in the exhaust pipe, for example.

If this is the case, then the respective starting procedure of the internal combustion engine is subsequently classified as defective. The question of whether a starting procedure is defective depends only on whether or not an unacceptably large quantity of fuel enters the exhaust pipe. This question does not depend on whether or not the starting procedure has led to successful starting of the internal combustion engine.

Figure 2A:
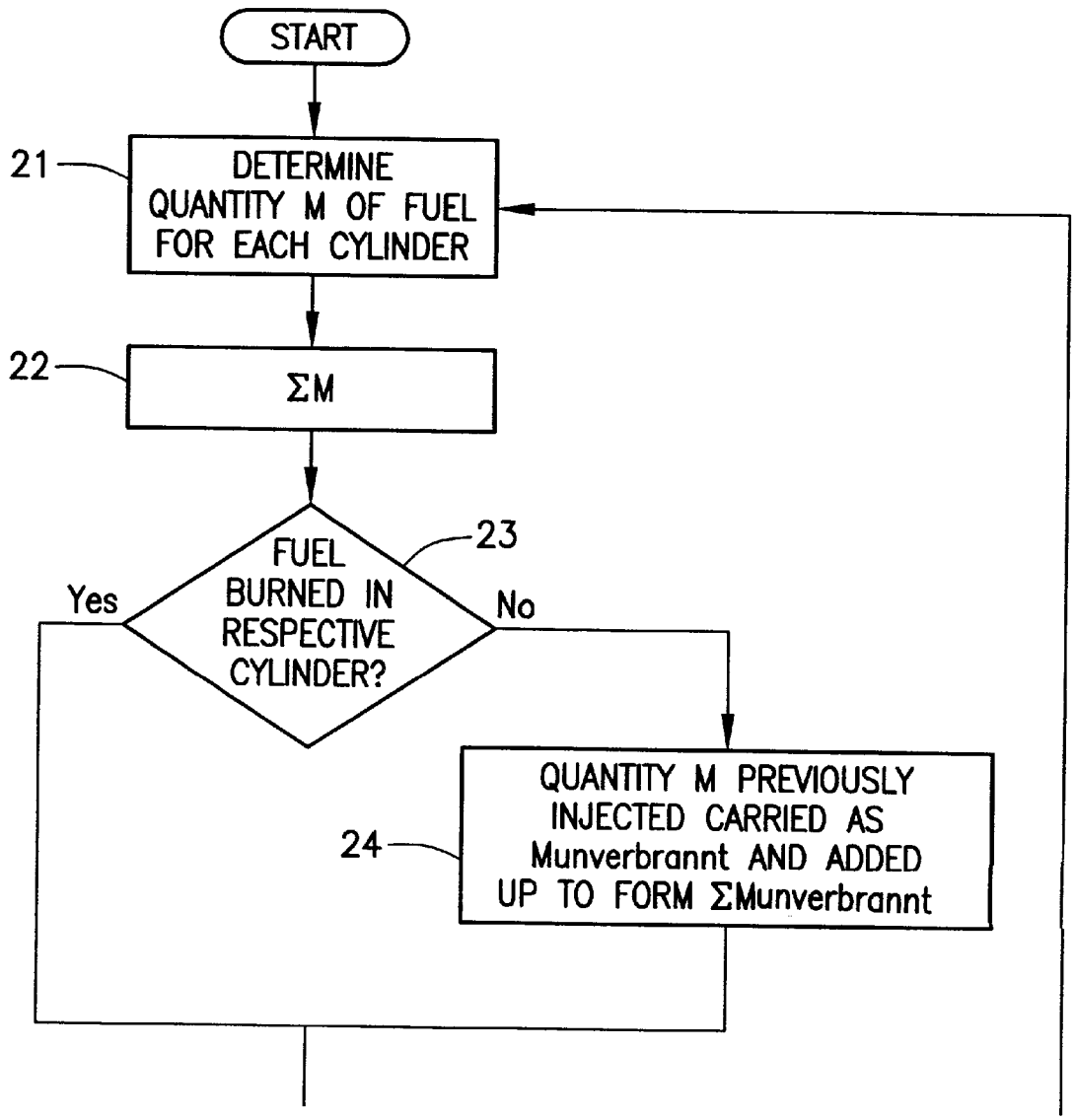
FIG. 2 shows a schematic block diagram of one embodiment of a method according to the present invention for operating the fuel supply system from FIG. 1.
Figure 2B:
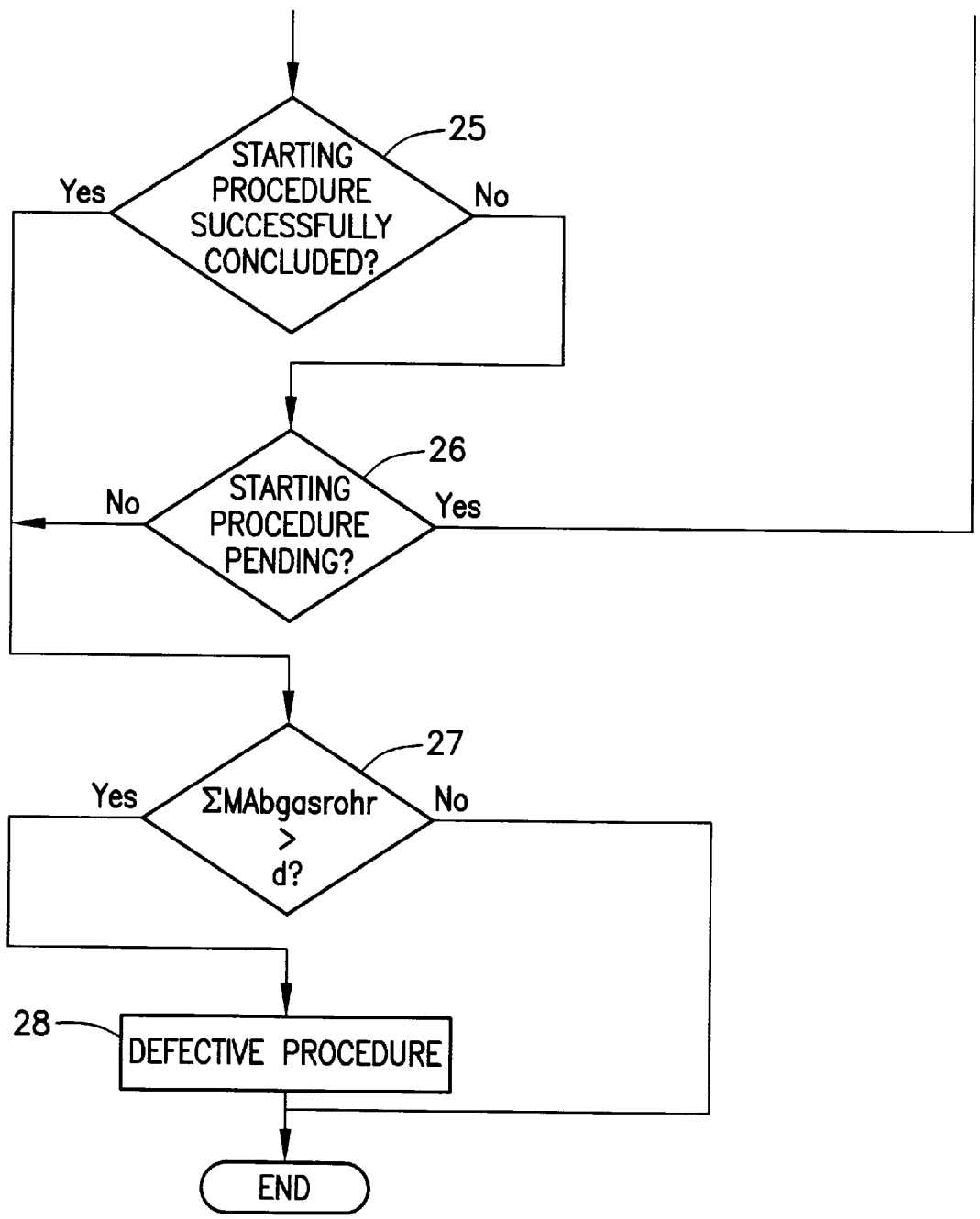

To detect such a defective starting procedure in particular, the following method represented in FIG. 2 is carried out by control unit 16. The individual blocks of the method may be implemented, for example, as modules of a program or the like in control unit 16.

In the embodiment described here, it is assumed that the internal combustion engine is to be started at low outside temperatures and that the internal combustion engine is not at operating temperature. Under other conditions, the embodiment may be adapted accordingly.

In a step 21, respective quantity M of fuel to be injected is determined by control unit 16 for each cylinder of the internal combustion engine. Respective injection valve 13 is then controlled accordingly into its opened condition by control unit 16, and the respective sparkplug is fired by control unit 16. This process takes place in the stated sequence for the individual cylinders of the internal combustion engine.

In a step 22, quantities M of fuel to be injected into the individual cylinders are added up by control unit 16. Thus, the sum $\Sigma M$ of the total quantity of fuel injected into the cylinders is formed.

In a step 23, a test is performed to determine whether the quantity of fuel injected into each of the cylinders and ignited was in fact also burned in the respective cylinder.

This test can be performed as a function of one or more of the following performance quantities of the internal combustion engine:

- an increase in temperature of the respective cylinder or all cylinders,
- an increase in pressure in the respective cylinder,
- an increase in rpm of the internal combustion engine,
- the lambda value of the exhaust gas of the respective cylinder or all cylinders, obtained by a probe evaluating the oxygen partial pressure,
- the quantity of unburned fuel in the exhaust gas of the respective cylinder or all cylinders,
- changes in ignition voltage.

By basing the respective performance quantities on a time belonging to the respective cylinder, an increase in temperature of the respective cylinder and thus combustion in that cylinder can be deduced from an increase in temperature of all the cylinders of the internal combustion engine. Accordingly, a contribution to an increase in rpm due to the respective cylinder and thus combustion in that cylinder can be deduced from an increase in rpm of the internal combustion engine.

If control unit 16 finds in its test in step 23 that no combustion has occurred in the respective cylinder, then in a step 24, quantity M of fuel previously injected into this cylinder is carried as quantity Munverbrannt of unburned fuel and is added up. This forms a sum $\Sigma$Munverbrannt of the total quantity of fuel injected into the cylinders but not burned.

Of total quantity $\Sigma$Munverbrannt of unburned fuel, only a portion enters the exhaust pipe, reaching the lambda sensor there. The remaining unburned fuel is entrained or washed away in the oil of the internal combustion engine or it builds up the fuel film on the inside walls of the cylinders or, with intake manifold injection, on the inside walls of the intake manifold of the internal combustion engine. This portion $\Sigma$MAbgasrohr of total quantity $\Sigma$Munverbrannt of unburned fuel entering the exhaust pipe is determined in step 24 by a weighting factor a which depends on engine temperature as follows:

$$\Sigma \text{MAbgasrohr} = a \cdot \Sigma \text{Munverbrannt}$$

where $0 \leq a \leq 1$ and $a=f(\text{TMotor})$.

If it is found in step 23 that combustion has actually taken place in the respective cylinder, step 24 is bypassed instead of being carried out. Then step 25 is carried out immediately, where control unit 16 determines whether the starting procedure has been successfully concluded. This can be done by a termination criterion.

This termination criterion may be, for example, an rpm threshold b which must be exceeded by rpm nmot of the internal combustion engine and/or a threshold value c which must be exceeded by an integrated air mass flow imlatm and/or a certain number of actual combustions in the internal combustion engine and/or exceeding a certain intake pressure or exhaust gas pressure or the like. Threshold values b and c may depend on engine temperature TMotor.

For example, if this rpm threshold b is exceeded, this means that the internal combustion engine has been started and thus the starting procedure was successful. As mentioned previously, however, this does not mean that the starting procedure was faultless.

If it is found in step 25 that the starting procedure still has not been concluded successfully, for example, if the internal combustion engine has not yet reached an adequate rpm, then control unit 16 performs a test in a step 26 to determine whether the starting procedure is still pending or whether the starting procedure was terminated.

In the first case, i.e., if the starting procedure is still underway, the procedure in FIG. 2 is continued with step 21. In the second case, i.e., if the starting procedure has been terminated, the procedure is continued with step 27. This step 27 is also carried out if it is found in step 25 that the starting procedure has been concluded successfully.

In step 27 the total quantity $\Sigma$MAbgasrohr of unburned fuel entering the exhaust pipe is evaluated. A test is performed to determine whether this total quantity $\Sigma$MAbgasrohr of unburned fuel is greater than a limit value d which depends on engine temperature. Thus, this test is performed:

$$\Sigma \text{MAbgasrohr} > d,$$

where $d=f(\text{TMotor})$.

If this test is positive, i.e., if total quantity $\Sigma$MAbgasrohr of unburned fuel entering the exhaust pipe is greater than limit value d, then a false start or a defective starting procedure is found in a subsequent step 28. However, if the above test is negative, the procedure according to FIG. 2 is concluded.

It should be pointed out here again explicitly that step 28 and thus a defective starting procedure can also be found by control unit 16 if the starting procedure has been concluded successfully according to step 24. According to FIG. 2, the question of fault is decided in step 27 only as a function of total quantity $\Sigma$MAbgasrohr of unburned fuel entering the exhaust pipe.

If a faulty starting procedure is found by control unit 16 according to step 28, then control unit 16 can conclude that pollution emissions by the internal combustion engine are high. Likewise, control unit 16 may optionally also use the finding that the pollution emissions are high in a defective manner in some other way, e.g., as part of an error diagnosis or error compensation or the like.

What is claimed is:

1. A fuel supply system for an internal combustion engine, comprising: a control unit for determining a quantity of a fuel to be supplied to a cylinder; an injection valve for injecting the quantity of the fuel to be supplied, wherein:

the control unit determines whether a combustion has taken place in the cylinder, and the control unit is capable of determining a quantity of the fuel previously supplied to the cylinder where no combustion has taken place.

2. The fuel supply system according to claim 1, wherein the internal combustion engine is disposed in a motor vehicle.

3. A control element for a control unit of an internal combustion engine, wherein the control element stores a program capable of being run on a computing device to execute the steps of:

determining a quantity of a fuel to be supplied to a cylinder, causing an injection valve to inject the quantity of the fuel to be supplied, performing a test to determine whether a combustion has taken place, and if the combustion is determined not to have taken place, determining a quantity of the fuel previously supplied to the cylinder.

4. The control element according to claim 3, wherein the control element includes a read-only memory.

5. The control element according to claim 3, wherein the internal combustion engine is disposed in a motor vehicle.

6. A method of operating a fuel supply system of an internal combustion engine, comprising the steps of:

determining a quantity of a fuel to be supplied to a cylinder;

causing an injection valve to inject the quantity of the fuel to be supplied;

performing a test to determine whether a combustion has taken place; and if the combustion is determined not to have taken place, determining a quantity of the fuel previously supplied to the cylinder.

7. The method according to claim 6, wherein the internal combustion engine is disposed in a motor vehicle.

8. The method according to claim 6, further comprising the step of:

adding up the quantity of the fuel previously supplied to the cylinder to form a quantity of the fuel added up.

9. The method according to claim 8, further comprising the step of:

weighting the quantity of the fuel added up to form a weighted quantity of the fuel.

10. The method according to claim 9, further comprising the steps of:

comparing the weighted quantity of the fuel with a limit value; and if the limit value is exceeded, determining an occurrence of a faulty starting procedure.

11. The method according to claim 6, wherein the test of whether the combustion has taken place is conducted as a function of at least one of:

an increase in a temperature of one of a respective cylinder and all cylinders, an increase in a pressure in the respective cylinder, an increase in rpm of the internal combustion engine, a lambda value of an exhaust gas of one of the respective cylinder and all cylinders, the lambda value obtained by a probe evaluating an oxygen partial pressure, a quantity of unburned fuel in the exhaust gas of one of the respective cylinder and all cylinders, and a change in an ignition voltage.

12. The method according to claim 6, further comprising the steps of:

performing a test to determine whether a starting procedure was successful; and if the starting procedure is determined to have been successful, comparing a quantity of the fuel remaining with a limit value.

13. The method according to claim 6, further comprising the steps of:

performing a test to determine whether a starting procedure has been terminated; and if the starting procedure is determined to have been terminated, comparing a quantity of the fuel remaining with a limit value.

* * * * *